US012494162B1

(12) United States Patent
Hsieh

(10) Patent No.: US 12,494,162 B1
(45) Date of Patent: Dec. 9, 2025

(54) MICRO-LED PANEL, OPERATING METHOD THEREOF AND PIXEL COMPENSATION CIRCUIT

(71) Applicant: AUO Corporation, Hsinchu (TW)

(72) Inventor: An-Hsiung Hsieh, Hsinchu (TW)

(73) Assignee: AUO CORPORATION, Hsinchu (TW)

( * ) Notice: Subject to any disclaimer, the term of this patent is extended or adjusted under 35 U.S.C. 154(b) by 0 days.

(21) Appl. No.: 18/971,978

(22) Filed: Dec. 6, 2024

(30) Foreign Application Priority Data

Jun. 7, 2024 (TW) ................................ 113121245

(51) Int. Cl.

*B60Q 11/00* (2006.01)
*B60Q 1/26* (2006.01)
*B60Q 1/30* (2006.01)
*B60Q 1/44* (2006.01)
*G09G 3/32* (2016.01)
*H05B 33/08* (2020.01)

(52) U.S. Cl.

CPC ....... *G09G 3/32* (2013.01); *G09G 2300/0852* (2013.01); *G09G 2330/08* (2013.01)

(58) Field of Classification Search

CPC ............ G09G 3/32; G09G 2300/0852; G09G 2330/08

See application file for complete search history.

(56) References Cited

U.S. PATENT DOCUMENTS

| | | | | |
|---|---|---|---|---|
| 10,726,773 | B2 | 7/2020 | Xi | |
| 2016/0268364 | A1* | 9/2016 | Yin | G09G 3/3233 |
| 2017/0267174 | A1* | 9/2017 | Nakayama | B60Q 1/44 |

FOREIGN PATENT DOCUMENTS

| | | | |
|---|---|---|---|
| TW | I728749 | B | 5/2021 |

* cited by examiner

*Primary Examiner* — Kwang-Su Yang

(74) *Attorney, Agent, or Firm* — Tim Tingkang Xia, Esq.; Troutman Pepper Locke LLP

(57) ABSTRACT

A micro-LED panel, an operating method thereof, and a pixel compensation circuit are provided. The pixel compensation circuit includes: a main LED; a backup LED; a first transistor coupled to the main LED and receiving an emission control signal; a second transistor coupled to the backup LED; and a first capacitor coupled to the second transistor and receiving the emission control signal. When the main LED fails, the first capacitor is fused and damaged to be short-circuited, and the second transistor drives the backup LED to emit light.

9 Claims, 5 Drawing Sheets

MICRO-LED PANEL, OPERATING METHOD THEREOF AND PIXEL COMPENSATION CIRCUIT

CROSS-REFERENCE TO RELATED PATENT APPLICATION

This non-provisional application claims priority to and the benefit of, pursuant to 35 U.S.C. § 119(a), patent application No. 113121245 filed in Taiwan on Jun. 7, 2024. The disclosure of the above application is incorporated herein in its entirety by reference.

Some references, which may include patents, patent applications and various publications, are cited and discussed in the description of this disclosure. The citation and/or discussion of such references is provided merely to clarify the description of the present disclosure and is not an admission that any such reference is “prior art” to the disclosure described herein. All references cited and discussed in this specification are incorporated herein by reference in their entireties and to the same extent as if each reference were individually incorporated by reference.

FIELD

The present disclosure relates to a micro light-emitting diode (micro-LED) panel, an operating method thereof, and a pixel compensation circuit.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A micro light-emitting diode (micro-LED) exhibits characteristics such as flexibility, warping resistance and ease of bending, allowing a display to be cut into various shapes for a wide range of applicable products and tightly attached to different surfaces in various shapes, thus significantly enhancing the degree of freedom of the product design. In addition, the micro-LED exhibits high transparency, enabling a user to see through the display panel to the objects behind. The combination of high transparency and high brightness makes the micro-LED the ideal display technology for augmented reality (AR) and mixed reality (MR) applications, which is well-suited for diverse environments such as in-vehicle displays, operating rooms, smart windows, and commercial showcases.

The micro-LED is a novel display technology that employs tiny LEDs as the display pixels. Each micro-LED is a miniature individual light-emitting diode that may be used to display an image by controlling its brightness. A micro-LED display panel is formed by millions of micro-LEDs, and the micro-LEDs may be independently controlled in terms of color and brightness, thereby facilitating image displaying with high resolution and high contrast.

Certain advantages of the micro-LED include:

(1) Display Quality: The micro-LED may facilitate higher resolution and a wider color gamut, thus providing clearer and more vivid images.

(2) Contrast: The micro-LEDs may be independently controlled in terms of brightness, thus facilitating higher contrast, leading to sharper image quality.

(3) Energy Efficiency: Compared to the conventional liquid crystal display technology, the micro-LED display has higher energy efficiency because it does not require a backlight, and the micro-LED itself has higher energy efficiency.

(4) Lifespan: The micro-LED has a longer lifespan, lasting tens of thousands of hours or more, thus reducing the frequency of display replacements.

Overall, the micro-LED technology holds immense potential in the display industry, offering higher quality and more durable display solutions.

Currently, to increase the yield, a pixel of the micro-LED may include a main LED and a backup LED. When the main LED operates normally, the main LED performs light emission for display. When the main LED fails, it requires repair, and the backup LED performs light emission for display.

However, conventionally, the repair of the micro-LED is labor intensive and time consuming.

Therefore, a heretofore unaddressed need for a micro-LED display panel, an operating method thereof and a pixel compensation circuit exists in the art to address the aforementioned deficiencies and inadequacies.

SUMMARY

According to a first aspect of the present disclosure, a pixel compensation circuit is provided, including: a main LED; a backup LED; a first transistor, coupled to the main LED and receiving an emission control signal; a second transistor, coupled to the backup LED; and a first capacitor, coupled to the second transistor and receiving the emission control signal. When the main LED fails, the first capacitor is fused and damaged to be short-circuited, and the second transistor drives the backup LED to emit light.

According to a second aspect of the present disclosure, a micro-LED panel is provided, including a plurality of pixel compensation circuits. Each pixel compensation circuit includes: a main LED; a backup LED; a first transistor, coupled to the main LED and receiving an emission control signal; a second transistor, coupled to the backup LED; and a first capacitor, coupled to the second transistor and receiving the emission control signal. When the main LED fails, the first capacitor is fused and damaged to be short-circuited, and the second transistor drives the backup LED to emit light.

According to a third aspect of the present disclosure, an operating method of a micro-LED panel is provided. The micro-LED panel includes a plurality of pixel compensation circuits. Each pixel compensation circuit includes a main LED, a backup LED, a first transistor, a second transistor and a first capacitor. The operating method includes: when the main LED fails, fusing and damaging the first capacitor to be short-circuited, where the second transistor drives the backup LED to emit light.

These and other aspects of the present disclosure will become apparent from the following description of the embodiment taken in conjunction with the following drawings, detailed description and the claims.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein.

DETAILED DESCRIPTION

The technical terms used in the disclosure are based on the customary terminology in the technical field. If any term is specifically described or defined in the disclosure, the interpretation of such term shall be governed by the description or definition provided herein. The embodiments disclosed herein may have one or more technical features. To the extent permitted by applicable law, those skilled in the art may selectively implement some or all of the technical features of any embodiment, or selectively combine some or all of the technical features of these embodiments.

Figure 1:
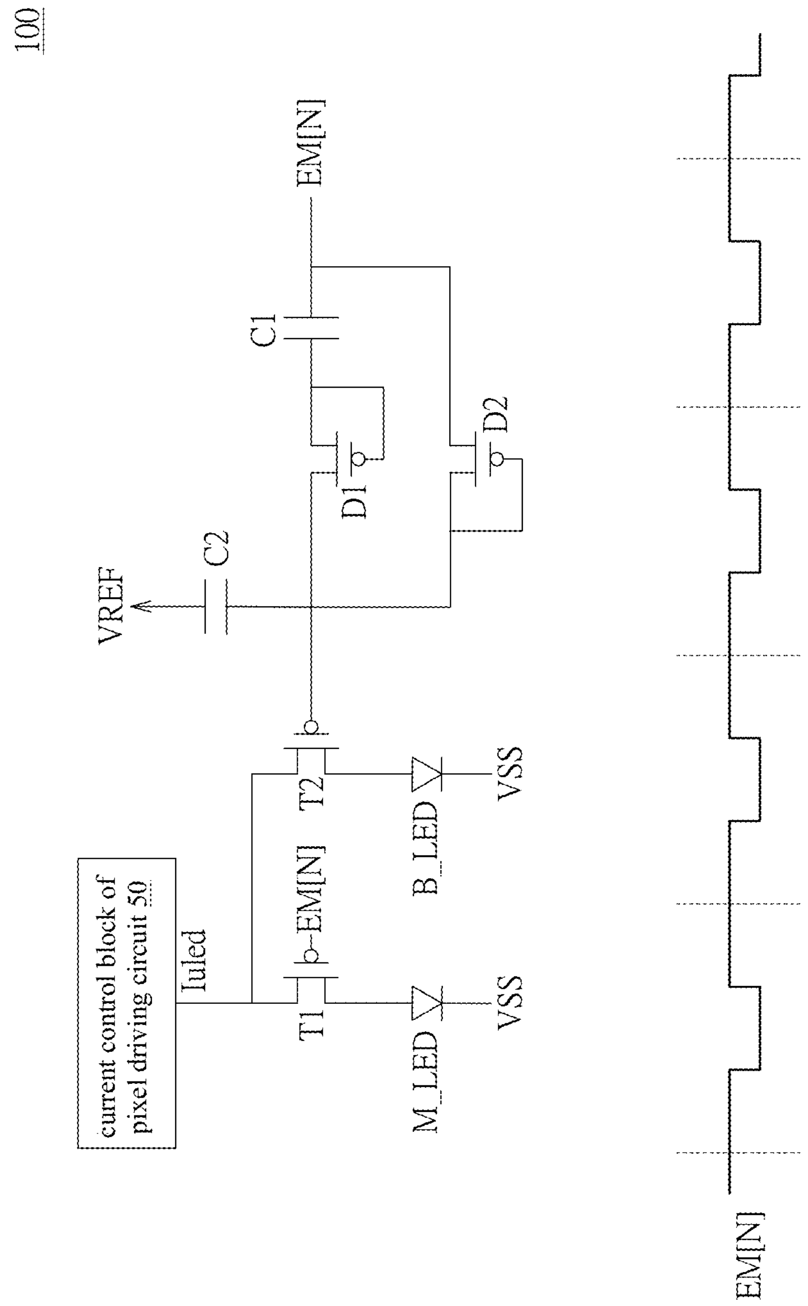
FIG. 1 is a circuitry diagram illustrating a pixel compensation circuit according to one embodiment of the present disclosure.

FIG. 1 is a circuitry diagram illustrating a pixel compensation circuit according to one embodiment of the present disclosure. As shown in FIG. 1, the pixel compensation circuit 100 according to one embodiment of the present disclosure includes a main LED M_LED, a backup LED B_LED, a first transistor T1, a second transistor T2, a first capacitor C1, a second capacitor C2, a first diode D1 and a second diode D2.

The main LED M_LED includes a first end (such as an anode) coupled to a first end (such as a drain) of the first transistor T1 and a second end (such as a cathode) coupled to a ground VSS.

The backup LED B_LED includes a first end (such as an anode) coupled to a first end (such as a drain) of the second transistor T2 and a second end (such as a cathode) coupled to the ground VSS.

The first transistor T1 is coupled to the main LED M_LED to drive the main LED M_LED to emit light. The first transistor T1 includes a first end (such as a drain) coupled to the first end of the main LED M_LED, a control end (such as a gate) receiving an emission control signal EM[N], and a second end (such as a source) receiving an emission current $I_{uled}$ provided by a pixel driving circuit current control block 50.

The second transistor T2 is coupled to the backup LED B_LED to drive the backup LED B_LED to emit light. The second transistor T2 includes a first end (such as a drain) coupled to the first end of the backup LED B_LED, a control end (such as a gate) coupled to the second capacitor C2, the first diode D1 and the second diode D2, and a second end (such as a source) coupled to the second end of the first transistor T1 and receiving the emission current $I_{uled}$ provided by the pixel driving circuit current control block 50.

The first capacitor C1 includes a first end receiving the emission control signal EM[N] and a second end coupled to the first diode D1. The capacitance of the first capacitor C1 is extremely low. When the main LED M_LED fails, the first capacitor C1 may be fused and damaged to be short-circuited, such that the backup LED B_LED is used to emit light.

The second capacitor C2 includes a first end coupled to a reference voltage VREF and a second end coupled to the control end of the second transistor T2, the first diode D1 and the second diode D2. The second capacitor C2 is used to stabilize the voltage of the control end of the second transistor T2.

The first diode D1 includes a first end coupled to the first capacitor C1 and a second end coupled to the control end of the second transistor T2. The first diode D1 may be used to reduce the unrelated coupling effect caused by switching the EM[N] signal.

The second diode D2 includes a first end receiving the emission control signal EM[N] and a second end coupled to the control end of the second transistor T2.

FIG. 1 also shows the emission control signal EM[N]. In one embodiment of the present disclosure, the emission control signal EM[N] is not limited to a periodic signal in any form. For example, the emission control signal EM[N] may be a pulse signal or a signal with a duty cycle, without being limited thereto.

FIGS. 2A to 2D are operating schematic views of a pixel compensation circuit 100 according to one embodiment of the present disclosure.

Figure 2A:
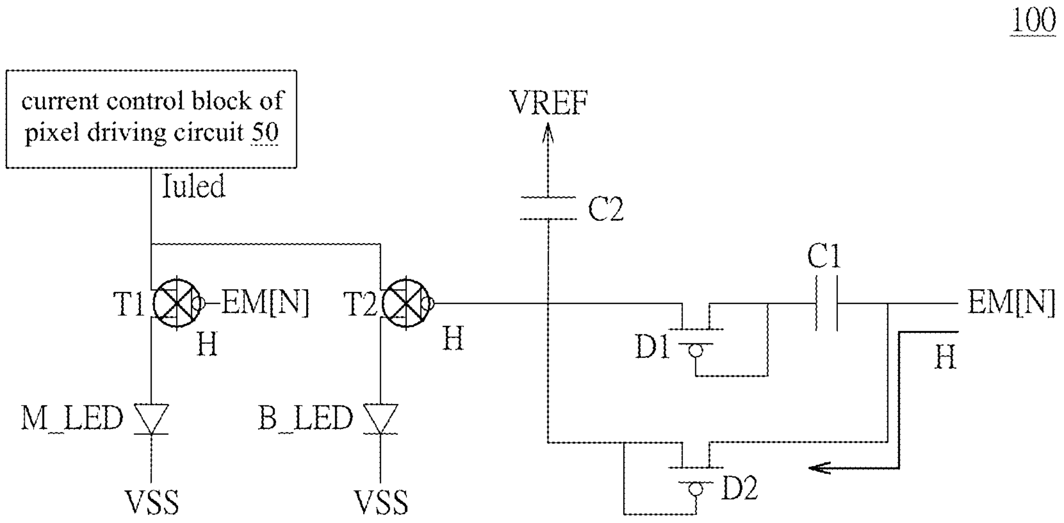
FIGS. 2A to 2D are operating schematic views of a pixel compensation circuit 100 according to one embodiment of the present disclosure.

FIG. 2A shows the operating schematic view of a pixel compensation circuit 100 according to one embodiment of the present disclosure when the emission control signal EM[N] is in a high logic state and the main LED M_LED is normal. When the emission control signal EM[N] is in the high logic state, the first transistor T1 is off, so the main LED M_LED does not emit light. When the emission control signal EM[N] is in the high logic state, through the second diode D2, the voltage of the control end of the second transistor T2 is also in the high logic state. Thus, the second transistor T2 is off, and the backup LED B_LED does not emit light.

Figure 2B:
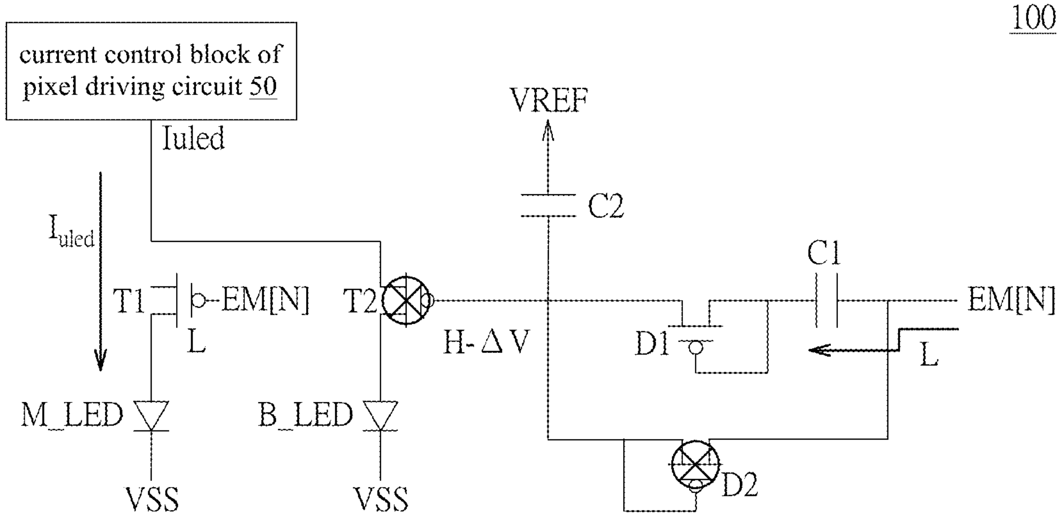

FIG. 2B shows the operating schematic view of a pixel compensation circuit 100 according to one embodiment of the present disclosure when the emission control signal EM[N] is in a low logic state and the main LED M_LED is normal. When the emission control signal EM[N] is in the low logic state, the first transistor T1 is on, so the main LED M_LED emits light. When the emission control signal EM[N] transitions from the high logic state to the low logic state, it causes a capacitive coupling effect of the first capacitor C1, which allows the voltage of the control end of the second transistor T2 to become $H-\Delta V$ (where H represents the high logic voltage of the emission control signal EM[N]). Even though the capacitance of the first capacitor C1 is extremely low, resulting in a negligible voltage change $\Delta V$ at the gate of the second transistor T2 due to the capacitive coupling, it is still sufficient to keep the second transistor T2 off, and the backup LED B_LED does not emit light.

Figure 2C:
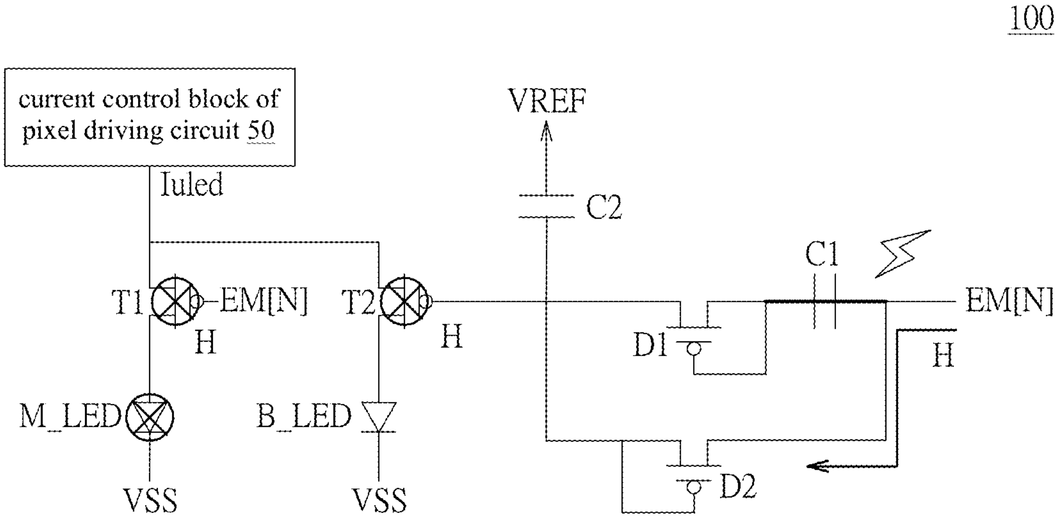

FIG. 2C shows the operating schematic view of a pixel compensation circuit 100 according to one embodiment of the present disclosure when the emission control signal EM[N] is in a high logic state and the main LED M_LED fails. When the main LED M_LED fails, the first capacitor C1 is fused and damaged to be short-circuited. When the emission control signal EM[N] is in the high logic state, the first transistor T1 is off, and the main LED M_LED does not emit light because it fails. When the emission control signal EM[N] is in the high logic state, through the second diode D2, the voltage of the control end of the second transistor T2 is also in the high logic state. Thus, the second transistor T2 is off, and the backup LED B_LED does not emit light.

Figure 2D:
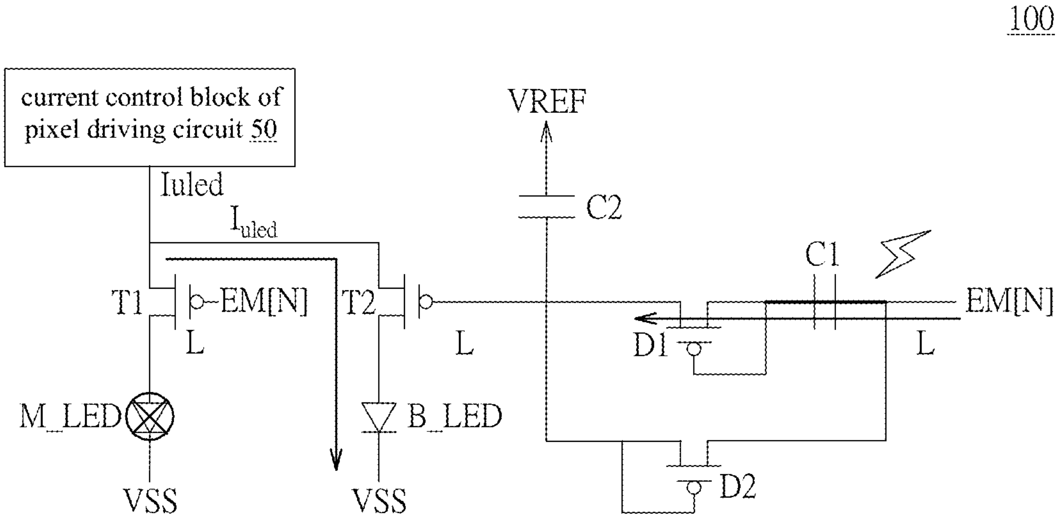

FIG. 2D shows the operating schematic view of a pixel compensation circuit 100 according to one embodiment of the present disclosure when the emission control signal EM[N] is in a low logic state and the main LED M_LED fails. When the main LED M_LED fails, the first capacitor C1 is fused and damaged to be short-circuited. When the emission control signal EM[N] is in the low logic state, the first transistor T1 is on, but the main LED M_LED does not emit light because it fails. When the emission control signal EM[N] is in the low logic state, the first capacitor C1 is short-circuited and the first transistor T1 is on, allowing the voltage of the control end of the second transistor T2 to become L (where L represents the low logic voltage of the emission control signal EM[N]), such that the second transistor T2 is on, and the current $I_{uled}$ flows through the backup LED B_LED, such that the backup LED B_LED emits light.

Figure 3:
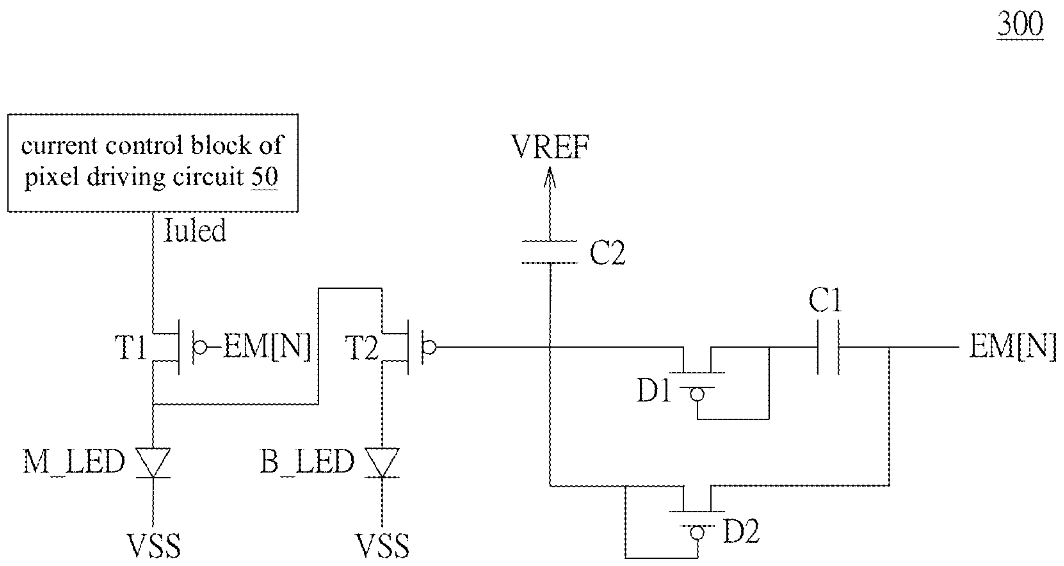
FIG. 3 is a circuitry diagram illustrating a pixel compensation circuit according to another one embodiment of the present disclosure.

FIG. 3 is a circuitry diagram illustrating a pixel compensation circuit according to another one embodiment of the present disclosure. In the pixel compensation circuit 300, the second end (such as the source) of the second transistor T2 is instead coupled to the first end of the first transistor T1, and the other component coupling relationships are basically identical to those in the pixel compensation circuit 100.

The operations of the pixel compensation circuit 300 is identical or similar to the operations as shown in FIGS. 2A to 2D, and the details thereof are not herein elaborated.

Figure 4:
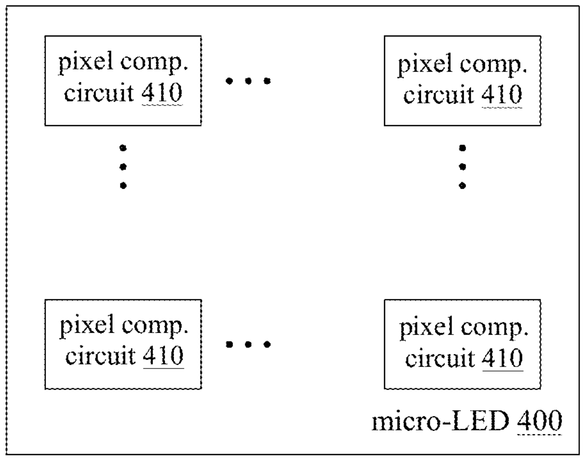
FIG. 4 illustrates a micro-LED panel according to one embodiment of the present disclosure.

FIG. 4 illustrates a micro-LED panel according to one embodiment of the present disclosure. As shown in FIG. 4, the micro-LED panel 400 according to one embodiment of the present disclosure includes a plurality of pixel compensation circuits 410. Each pixel compensation circuit 410 may be implemented by the pixel compensation circuit 100 or the pixel compensation circuit 300, and are in the scope of the present disclosure.

Figure 5:
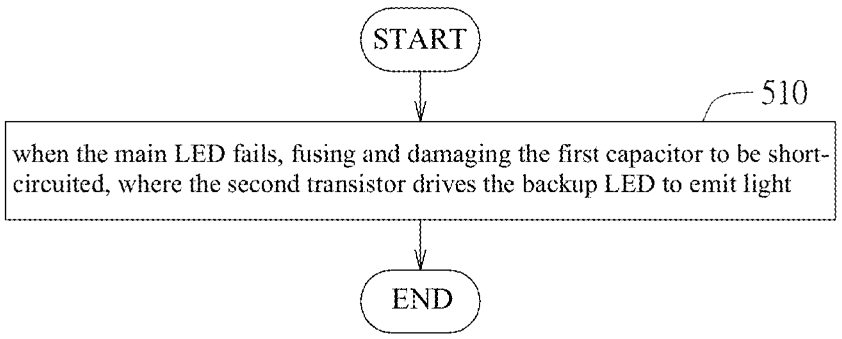
FIG. 5 is a flowchart illustrating an operating method of a micro-LED panel according to one embodiment of the present disclosure.

FIG. 5 is a flowchart illustrating an operating method of a micro-LED panel according to one embodiment of the present disclosure. The operating method of the micro-LED panel includes: (510) when the main LED fails, fusing and damaging the first capacitor to be short-circuited, where the second transistor drives the backup LED to emit light.

In the related art, since only the main LED is bonded, the assumed bonding yield of the main LED is 95%, considering a subsequent process yield of +5%*(yield of the LED repair process). Further, the repair in the related art is time consuming and labor intensive.

In one embodiment of the present disclosure, since both the main LED and the backup LED are bonded, the expected bonding yield of the main LED is about 95%, considering the subsequent process yield of +5%*95%+5%*5%*(yield of the LED repair process), where the 95% represents the bonding yield of the backup LED. The yield is significantly improved. In addition, the repair in the embodiment of the present disclosure is less labor intensive and less time consuming.

While the disclosure may describe numerous specific details, these should not be construed as limiting the scope of the claimed invention but rather as descriptions of the features of specific embodiments. Certain features described in the context of individual embodiments in the disclosure may also be implemented in combination in a single embodiment. Conversely, various features described in the context of a single embodiment may be implemented individually or in any suitable subcombination in multiple embodiments. Moreover, although features may initially be described as operating in certain combinations, and may even be initially recited as such, in some cases one or more features may be omitted from such combination, and the recited combination may be directed to a subcombination or variation of a subcombination. Similarly, although operations are illustrated in the drawings as occurring in a particular order, this should not be construed as requiring these operations to be performed in the particular order shown or requiring all illustrated operations to be performed in order to achieve the desired result.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A micro light-emitting diode (micro-LED) panel, comprising:

a plurality of pixel compensation circuits, each of the pixel compensation circuits comprising:

a main LED;

a backup LED;

a first transistor, coupled to the main LED and receiving an emission control signal;

a second transistor, coupled to the backup LED; and a first capacitor, coupled to the second transistor and receiving the emission control signal, wherein when the main LED fails, the first capacitor is fused and damaged to be short-circuited, and the second transistor drives the backup LED to emit light.

2. The micro-LED panel according to claim 1, wherein each of the pixel compensation circuits further comprises:

a second capacitor, coupled to the second transistor;

a first diode, coupled between the second transistor and the first capacitor; and a second diode, coupled to the second transistor, wherein:

the main LED comprises a first end coupled to the first transistor and a second end coupled to a ground;

the backup LED comprises a first end coupled to the second transistor and a second end coupled to the ground;

the first transistor comprises a first end coupled to the first end of the main LED, a control end receiving the emission control signal, and a second end receiving an emission current;

the second transistor comprises a first end coupled to the first end of the backup LED, a control end coupled to the second capacitor, and a second end coupled to the first end or the second end of the first transistor;

the first capacitor comprises a first end receiving the emission control signal and a second end coupled to the first diode;

the second capacitor comprises a first end coupled to a reference voltage and a second end coupled to the control end of the second transistor;

the first diode comprises a first end coupled to the first capacitor and a second end coupled to the control end of the second transistor; and the second diode comprises a first end receiving the emission control signal and a second end coupled to the control end of the second transistor.

3. The micro-LED panel according to claim 2, wherein:

when the emission control signal is in a high logic state and the main LED is normal, the first transistor is off, the main LED does not emit light, the second transistor is off, and the backup LED does not emit light;

when the emission control signal is in a low logic state and the main LED is normal, the first transistor is on to drive the main LED to emit light, the second transistor is off, and the backup LED does not emit light;

when the emission control signal is in the high logic state and the main LED fails, the first transistor is off, the second transistor is off, and the backup LED does not emit light; and when the emission control signal is in the low logic state and the main LED fails, the first transistor is on, the main LED fails and does not emit light, the first capacitor is short-circuited, and the first diode is on, such that the second transistor is on to drive the backup LED to emit light.

4. A pixel compensation circuit, comprising:

a main light-emitting diode (LED);

a backup LED;

a first transistor, coupled to the main LED and receiving an emission control signal;

a second transistor, coupled to the backup LED; and a first capacitor, coupled to the second transistor and receiving the emission control signal, wherein when the main LED fails, the first capacitor is fused and damaged to be short-circuited, and the second transistor drives the backup LED to emit light.

5. The pixel compensation circuit according to claim 4, further comprising:

a second capacitor, coupled to the second transistor;

a first diode, coupled between the second transistor and the first capacitor; and a second diode, coupled to the second transistor, wherein:

the main LED comprises a first end coupled to the first transistor and a second end coupled to a ground;

the backup LED comprises a first end coupled to the second transistor and a second end coupled to the ground;

the first transistor comprises a first end coupled to the first end of the main LED, a control end receiving the emission control signal, and a second end receiving an emission current;

the second transistor comprises a first end coupled to the first end of the backup LED, a control end coupled to the second capacitor, and a second end coupled to the first end or the second end of the first transistor;

the first capacitor comprises a first end receiving the emission control signal and a second end coupled to the first diode;

the second capacitor comprises a first end coupled to a reference voltage and a second end coupled to the control end of the second transistor;

the first diode comprises a first end coupled to the first capacitor and a second end coupled to the control end of the second transistor; and the second diode comprises a first end receiving the emission control signal and a second end coupled to the control end of the second transistor.

6. The pixel compensation circuit according to claim 5, wherein:

when the emission control signal is in a high logic state and the main LED is normal, the first transistor is off, the main LED does not emit light, the second transistor is off, and the backup LED does not emit light;

when the emission control signal is in a low logic state and the main LED is normal, the first transistor is on to drive the main LED to emit light, the second transistor is off, and the backup LED does not emit light;

when the emission control signal is in the high logic state and the main LED fails, the first transistor is off, the second transistor is off, and the backup LED does not emit light; and when the emission control signal is in the low logic state and the main LED fails, the first transistor is on, the main LED fails and does not emit light, the first capacitor is short-circuited, and the first diode is on, such that the second transistor is on to drive the backup LED to emit light.

7. An operating method of a micro light-emitting diode (micro-LED) panel, the micro-LED panel comprising a plurality of pixel compensation circuits, each of the pixel compensation circuits comprising a main LED, a backup LED, a first transistor, a second transistor and a first capacitor, the operating method comprising:

when the main LED fails, fusing and damaging the first capacitor to be short-circuited, wherein the second transistor drives the backup LED to emit light.

8. The operating method according to claim 7, wherein:

the first transistor is coupled to the main LED and receives an emission control signal;

the second transistor is coupled to the backup LED; and the first capacitor is coupled to the second transistor and receives the emission control signal, wherein each of the pixel compensation circuits further comprises:

a second capacitor, coupled to the second transistor;

a first diode, coupled between the second transistor and the first capacitor; and a second diode, coupled to the second transistor, wherein:

the main LED comprises a first end coupled to the first transistor and a second end coupled to a ground;

the backup LED comprises a first end coupled to the second transistor and a second end coupled to the ground;

the first transistor comprises a first end coupled to the first end of the main LED, a control end receiving the emission control signal, and a second end receiving an emission current;

the second transistor comprises a first end coupled to the first end of the backup LED, a control end coupled to the second capacitor, and a second end coupled to the first end or the second end of the first transistor;

the first capacitor comprises a first end receiving the emission control signal and a second end coupled to the first diode;

the second capacitor comprises a first end coupled to a reference voltage and a second end coupled to the control end of the second transistor;

the first diode comprises a first end coupled to the first capacitor and a second end coupled to the control end of the second transistor; and the second diode comprises a first end receiving the emission control signal and a second end coupled to the control end of the second transistor.

9. The operating method according to claim 8, wherein when the emission control signal is in a high logic state and the main LED is normal, the first transistor is off, the main LED does not emit light, the second transistor is off, and the backup LED does not emit light;

when the emission control signal is in a low logic state and the main LED is normal, the first transistor is on to drive the main LED to emit light, the second transistor is off, and the backup LED does not emit light;

when the emission control signal is in the high logic state and the main LED fails, the first transistor is off, the second transistor is off, and the backup LED does not emit light; and when the emission control signal is in the low logic state and the main LED fails, the first transistor is on, the main LED fails and does not emit light, the first capacitor is short-circuited, and the first diode is on, such that the second transistor is on to drive the backup LED to emit light.

* * * * *